Nov. 19, 1968 S. A. D'ANGELO 3,412,203

TV PICTURE TUBE AND MOUNTING FRAME ASSEMBLY

Filed Aug. 16, 1965

SAMUEL A. D'ANGELO
INVENTOR.

BY Cumpston & Shaw
ATTORNEY 3,412,203

TV PICTURE TUBE AND MOUNTING FRAME ASSEMBLY

Samuel A. D'Angelo, Bath, N.Y., assignor to Mercury Aircraft Inc., Hammondsport, N.Y., a corporation of New York Filed Aug. 16, 1965, Ser. No. 479,861
2 Claims. (Cl. 178—7.82)

ABSTRACT OF THE DISCLOSURE

A mounting frame is bonded to a TV picture tube by a closed-cell, rigid, water-blown, polyurethane foam material securing the glass surface of the tube to the inside of the mounting frame both for resilient mounting purposes and to provide the sole implosion protection for the tube.

This invention relates to television viewing apparatus. More particularly, it relates to the problem of anchoring a television picture tube to a front mounting frame therefor.

A mounting frame or shell (as it is sometimes called) is commonly employed in mounting a television picture tube in the cabinet which normally houses the tube and associated electronic components. The frame is a generally rectangular, generally integral, generally metallic structure comprising top, bottom, and side members which together define a central aperture for the front face or screen area of the tube. Each frame member has a cross sectional shape on the inner side thereof in general conformity with the center of the frame or perimeter of the front face or screen portion of the tube. The frame has flange means with mounting holes therethrough for receiving mounting bolts or screws which fasten the frame to the TV cabinet.

In many instances the mounting frame is the sole support for the tube. Consequently, the tube must be secured to the frame.

One advantage of this structure is the implosion protection it provides. In this regard the interiors of television picture tubes are generally under great vacuums, evacuation of the tubes to over 29 inches of mercury being common. Because of the implosion hazard, early television sets were equipped with safety glass panels or clear plastic panels located in front of the picture tube so that if an implosion of the tube should occur, splinters of glass would not fly out forwardly of the set and injure viewers. Subsequently, a special type of glass panel was developed which could be bonded or cemented to the front face of the tube. More recently, it was found that substantial implosion protection is obtained by attaching the picture tube to a front mounting frame.

The attachment of a television picture tube to a front mounting frame has heretofore been accomplished by means of a gasket between the tube and the frame, and a thermosetting filler cement material such as an epoxy resin. This construction, however, has a number of disadvantages. One disadvantage resides in the number of parts employed in making the attachment. This gives rise to a substantial expense due to both parts and labor. Another disadvantage resides in the fact heat must be employed to set and cure the resin. Still another disadvantage is that the cement material has a tendency to shrink.

One object of this invention, therefore, is to provide a TV picture tube and mounting frame assembly which avoids these disadvantages.

A general object of this invention is to provide an improved TV picture tube and mounting frame assembly.

These and other objects as may appear as this specification proceeds are achieved by this invention.

In summary, this invention comprises a television picture tube and front mounting frame assembly comprising a closed cell, rigid foam material disposed between the tube and the frame, preferably adhering to the tube and preferably adhering to the frame. In preferred embodiments of the assembly of this invention, the foam material is preferably a polyurethane foam material formed in place, the foam density preferably being generally in a range from about 2 to about 30 pounds per cubic foot, although higher and lower densities are within the concepts of this invention, and usually in a range from about 7 to about 15 pounds.

This invention is further illustrated by the attached drawing which forms a material part of the disclosures of this invention.

Figure 1:
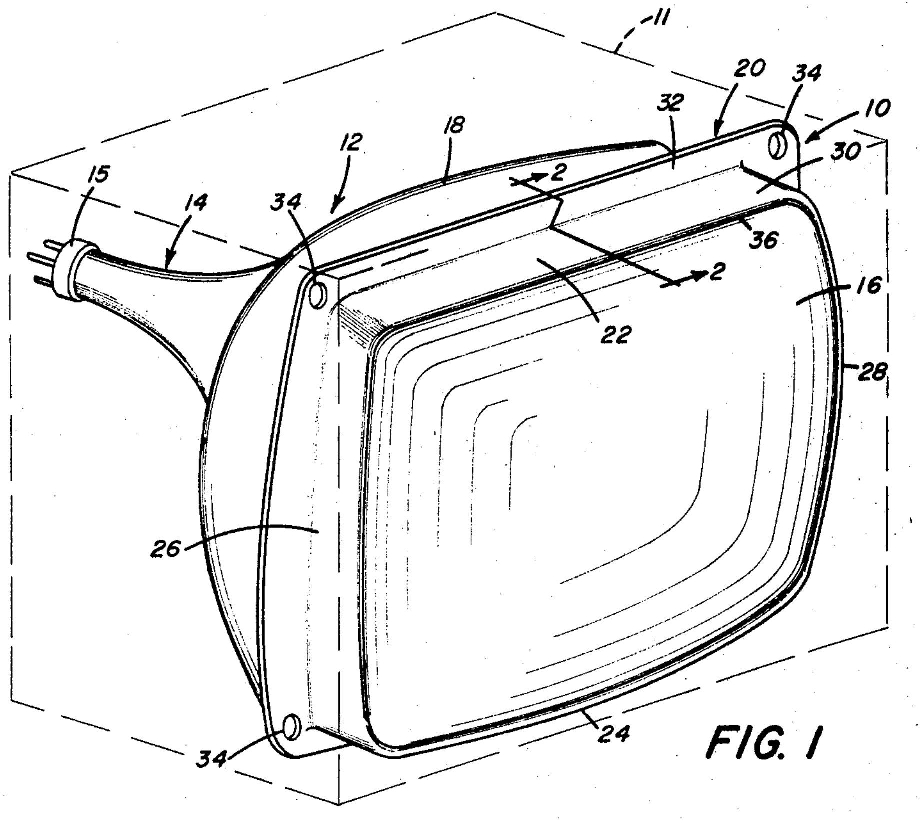
FIG. 1 is a front perspective view of a preferred specific embodiment of a television picture tube and front mounting frame assembly of this invention, which view shows in dashed lines the outline of a typical television cabinet.

In greater detail, FIG. 1 illustrates a television picture tube and front mounting assembly 10 in the position it normally would be when mounted in a television viewing cabinet 11. The assembly 10 comprises a kinescope or television picture tube 12 enclosed to a front mounting frame or shell according to the concepts of this invention.

The tube 12 comprises an evacuated glass bulb portion 14 joined to a gun portion 15. The bulb position 14 comprises a front face or screen portion 16 and a rearwardly extending envelope portion 18. The front face portion 16, generally rectangular in shape, curvingly merges at its generally rectangular perimeter into the rearwardly extending envelope portion 18.

The mounting frame 20 is a generally rectangular, integral, preferably metallic structure. It comprises a top member 22, a bottom member 24 and two side members 26 and 28. These members define a generally rectangular aperture for the screen 16 of the TV tube 12. Each of these members, as best shown in FIG. 2, comprises a web 30 with an outwardly extending flange 32 on the back thereof and with an inwardly turned bead 36 along the front.

Figure 2:
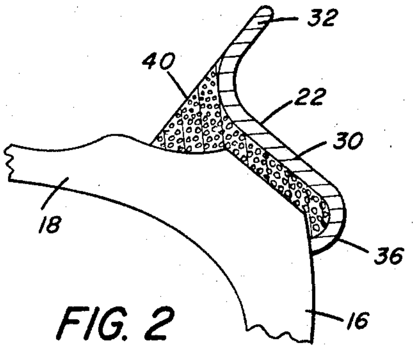
FIG. 2 is a sectional view of the television tube and mounting frame assembly, which view has been taken as indicated by the sectioning plane 2—2 in FIG. 1.

In FIG. 2 the flange 32 should be vertical and not inclined as shown.

The mounting frame 20 comprises mounting holes 34 at the corners through the outwardly extending flange 32. The inner side of the mounting frame 20, particularly the inner side of the web 30 of each member thereof, conforms generally to the adjacent perimeter of the television tube 12 when the mounting frame 20 and television tube 12 are in proper position. The inturned bead 36 of each member of the frame 20, when in proper position relative to the television tube 12, abuts the front face or screen of the tube 16. However, in position the adjacent surface of the tube 12 and the web 30 of each member are spaced apart.

The space between the inner side of the web 30 of each member of the frame 20 and the adjacent surface of the picture tube 12 is substantially filled with a closed cell, rigid foam material 40 having a density in a range from about 7 to about 15 pounds per cubic foot. The foam material 40 is preferably self-bonding to glass and to metal with the result that the foam material 40 in the embodiment shown is autogenously bonded to the glass of the tube 12 and to the inner side of the metallic frame 20. An especially preferred foam material 40 is rigid polyurethane foam. It is of particular advantage because polyurethane foam is a poor conductor of heat and electricity and it readily absorbs sound.

The polyurethane foam in the embodiment shown is made by admixing active hydrogen-containing, high molecular weight, organic material such as, for example, hydroxy terminated polyester material, polyester amide material, polyhydric polyether material and the like, with polyisocyanate material in the presence of catalyst material such as, for example, an amine, and gas producing material such as, for example, water, fluorinated hydrocarbon material and the like, and as desired, pigment material such as, for example, carbon black and the like. The mixture thus formed is rapidly introduced into the space between the tube 12 and the frame 20. The introduction can be by pouring by hand or by machine. It can be by spraying. Within a matter of a few seconds to a few minutes after introduction, the mixture polymerizes and forms solid, rigid, foam material. The technology of rigid, closed cell, polyurethane foam is well known and well documented. Therefore, it need not be further described herein. However, a rigid polyurethane foam formulation which has given satisfactory results is:

| Component A ingredients: | Parts by weight |
|---|---|
| Hydroxy terminated saturated polyester material which is a reaction product of a dicarboxylic acid, a glycol and a triol, which has a hydroxyl number of about 400, a viscosity at 25° C. of 10,000–15,000 centipoises and an average specific gravity at 25° C. of 1.17. (Polylite 34–505 product) | 50 |
| Water | 0.45 |
| Tertiary amine catalyst (Reichhold Chemicals Inc. Catalyst 46–400) | 0.6 |
| Finely divided, bone dry lamp black | 2.0 |
| Component B: | |
| A quasi prepolymer material of a polyol and a Diisocyanate, which material has an amine value of about 140, a viscosity at 25° C. of 1,500–2,500 centipoises and an average specific gravity at 25° C. of 1.25 (Polylite 34–625) | 50 |

Component A is made by admixing at 20–25° C. the ingredients A and B are admixed at 20–25° C. for 20–30 seconds and the resulting mixture poured by hand or machine or sprayed into place. The result is a foam which is fully expanded in about 2–3 minutes and which sets in ½–1 hour into a rigid foam having a typical density of about 10 pounds per cubic foot. Optimum properties of the foam material are achieved in 2–7 days at 20–25° C. In applying the pre-frothing technique, 0.45 part of a fluorinated hydrocarbon material such as Freon 11 and the like is used in place of water in the foregoing formulation.

The construction of the television picture tube and mounting frame assembly 10 of this invention is carried out by placing the frame 20 and tube 12 in position on a suitable jig, and then pouring out by machine or hand, or spraying the foam material into the space between the frame 20 and the adjacent surface of the tube 12. Preferably, the assembly 10 is stored or gently handled for the next 2–7 days at 20–25° C. in order to permit the foam material to cure.

Thus, there is provided an improved, TV picture tube and mounting frame assembly.

A feature of advantage of the assembly of this invention is the vastly improved implosion protection obtained thereby. Full sized models of the assembly have passed all of the standard implosion tests and these include tests wherein prior to the testing a model was held for 100 hours at 225–250° F. and a model was held at 100 hours at minus 50° F. In a number of tests not only was there no implosion at all but the television picture tube was never even cracked. These results are far superior to those achieved with assemblies employing gaskets and filler cements.

Another feature of advantage of the preferred embodiments of the assembly of this invention is the weight factor. Compared to prior art assemblies employing gaskets and filler cements the preferred embodiments of the assemblies of this invention represent a vast reduction in weight. This is shown by the following tabulated weights of prior art assemblies and assemblies of this invention wherein the shells and tubes in each category were of substantially the same weight.

| Size of Tube | Prior Art Assembly Weight | Invention Assembly Weight |
|---|---|---|
| 19 inch | ¾ pound | 0.08 pound. |
| 23 inch | 1 pound | 0.15 pound. |
| 25 inch | 1¼ pound | 0.20 pound. |

Thus, the assembly of this invention is much lighter than the prior art assembly.

A feature of advantage of the polyurethane foam embodiments of this invention is that no curing ovens are needed to cure the foam material. Although they can be used, they are not necessary as a practical matter.

Another feature of advantage of this invention is that in the assembly the tube is not under any substantial prestressed condition.

Still another feature of advantage is that no inside gasket is employed in the assembly.

Other features, advantages and specific embodiments of this invention will become readily apparent to those in the exercise of ordinary skill in the art after reading the foregoing disclosures. Unless otherwise indicated, the claimed subject matter encompasses said specific embodiments. In this connection, while a specific embodiment of this invention has been described in considerable detail, variations and modifications of this embodiment can be effected without departing from the spirit and scope of the invention substantially as disclosed and claimed.

I claim:

1. A television picture tube mounting frame and integral implosion protection assembly comprising:

(a) a glass television picture tube having a front face portion which curvingly merges at its perimeter into a rearwardly extending envelope portion;

(b) a single-piece mounting and implosion protection metal frame disposed to surround said perimeter of said tube;

(c) the forward edge of said frame curving over said perimeter and extending into engagement with said front face of said tube continuously around the region of said perimeter;

(d) the inside surface of the mid-section of said frame between its rearward edge and said forward edge extending around said perimeter and being substantially uniformly and closely spaced from the outer surface of said glass of said tube;

(e) said rearward edge of said frame being formed to define apertured flange means for mounting said frame and said tube;

(f) a closed-cell, rigid, water-blown, polyurethane foam material disposed between and substantially filling said space between said outer glass surface of said tube and said side surface of said frame;

(g) said foam material being autogenously bonded to both said outer glass surface of said tube and said inside surface of said frame;

(h) said foam material having sufficient tensile strength to provide the sole means for securing said frame and said tube together and to hold said glass surface to the region of said frame during any fracturing of said tube to provide the sole implosion protection for said tube; and (i) said foam material being foamed in place at a temperature substantially below thermal shock temperatures for said glass, said foam being cured to set without substantial tension in said foam material, and said foam being resilient enough to absorb mechanical shocks and accommodate relative expansion and contraction of said tube and said frame, whereby said foam material protects said tube against fracturing stress.

2. The assembly of claim 1 wherein said foam material has a density in a range of about 7 to 15 pounds per cubic foot.

References Cited

UNITED STATES PATENTS

| | | | |
|---|---|---|---|
| 2,047,020 | 7/1936 | Flaherty | 220—2.1 |
| 2,779,689 | 1/1957 | Reis | 117—104 |
| 3,013,117 | 12/1961 | Nichol | 178—7.82 |
| 3,200,188 | 8/1965 | Lange | 178—7.8 |
| 3,310,194 | 3/1967 | Brado | 178—7.82 |
| 3,340,358 | 9/1967 | De Gier | 178—7.8 |

ROBERT L. GRIFFIN, *Primary Examiner.*

J. A. ORSINO, *Assistant Examiner.*